US012621057B2

(12) United States Patent
Samuel et al.

(10) Patent No.: US 12,621,057 B2
(45) Date of Patent: May 5, 2026

(54) AUTO TUNING OF DWDM WAVELENGTH OF TRANSPONDER CONNECTED TO COLORED PASSIVE MULTIPLEXING MODULES

(71) Applicant: Cisco Technology, Inc., San Jose, CA (US)

(72) Inventors: Richard Moses Samuel, Bangalore (IN); Marco Liri, Nerviano (IT); Lokesh Kumar Thirumakudalu Nagaraju, Bangalore (IN); Stefano Andrea Pezzoli, Pioltello (IT); Vishwakarma Pooja Ramashankar, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 541 days.

(21) Appl. No.: 18/162,866

(22) Filed: Feb. 1, 2023

(65) Prior Publication Data

US 2024/0259104 A1     Aug. 1, 2024

(51) Int. Cl.
*H04B 10/50* (2013.01)
*H04J 14/02* (2006.01)
(Continued)

(52) U.S. Cl.
CPC ...... *H04B 10/5057* (2013.01); *H04J 14/0212* (2013.01); *H01S 3/06754* (2013.01); *H01S 3/1608* (2013.01)

(58) Field of Classification Search
CPC ............. H04B 10/5057; H04J 14/0212; H01S 3/06754; H01S 3/1608
See application file for complete search history.

(56) References Cited

U.S. PATENT DOCUMENTS

2008/0138072 A1*  6/2008  Sakamoto ........... H04J 14/0282
                                                    398/68
2012/0082458 A1   4/2012  Bouda et al.
                          (Continued)

FOREIGN PATENT DOCUMENTS

CN          108966054 A  * 12/2018    ......... H04Q 11/0067
WO    WO-2012034389 A1 *  3/2012    ............ H04J 14/025
WO          2014016274 A1    1/2014

OTHER PUBLICATIONS

"CFP2-DCO Product Family," Acacia Communications, Inc., https://acacia-inc.com/product/cfp2/, retrieved from the Internet on Feb. 1, 2023, 9 pages.

(Continued)

*Primary Examiner* — Pranesh K Barua
(74) *Attorney, Agent, or Firm* — Edell, Shapiro & Finnan, LLC

(57) ABSTRACT

A method for auto-tuning an optical transponder that is coupled to an optical terminal comprises: cycling through wavelengths in sequence by, for each wavelength: modulating the wavelength to convey a wavelength identifier of the wavelength, to produce a modulated wavelength that conveys the wavelength identifier; transmitting the modulated wavelength from the optical terminal through an optical demultiplexer that is configured to pass wavelengths to output ports of the optical demultiplexer; waiting to detect a response wavelength, transmitted by the optical transponder, which matches the wavelength; and determining, based on whether the response wavelength is detected, whether to repeat cycling using a next wavelength because the optical transponder is not tuned or to stop cycling because the optical transponder is tuned.

20 Claims, 9 Drawing Sheets

(51) Int. Cl.
*H01S 3/067* (2006.01)
*H01S 3/16* (2006.01)

(56) References Cited

U.S. PATENT DOCUMENTS

| | | | |
|---|---|---|---|
| 2013/0251364 A1* | 9/2013 | Pachnicke | H04J 14/0276 |
| | | | 398/79 |
| 2013/0315599 A1 | 11/2013 | Lam et al. | |
| 2013/0336655 A1* | 12/2013 | Grobe | H04J 14/025 |
| | | | 398/67 |
| 2014/0248056 A1 | 9/2014 | Zhang | |
| 2015/0318930 A1 | 11/2015 | Grobe et al. | |
| 2016/0309245 A1* | 10/2016 | Effenberger | H04Q 11/0005 |
| 2024/0259130 A1* | 8/2024 | Giorgi | H04J 14/0257 |

OTHER PUBLICATIONS

"Introducing Acacia's ZR Coherent Solutions," Eugene Park, Acacia Communications, Inc., https://acacia-inc.com/blog/introducing-acacias-zr-coherent-solutions/, Jul. 2, 2018, 5 pages.
"Cisco Network Convergence System 1010 Data Sheet," Cisco, Mar. 5, 2022, 27 pages.

* cited by examiner

300

400

700

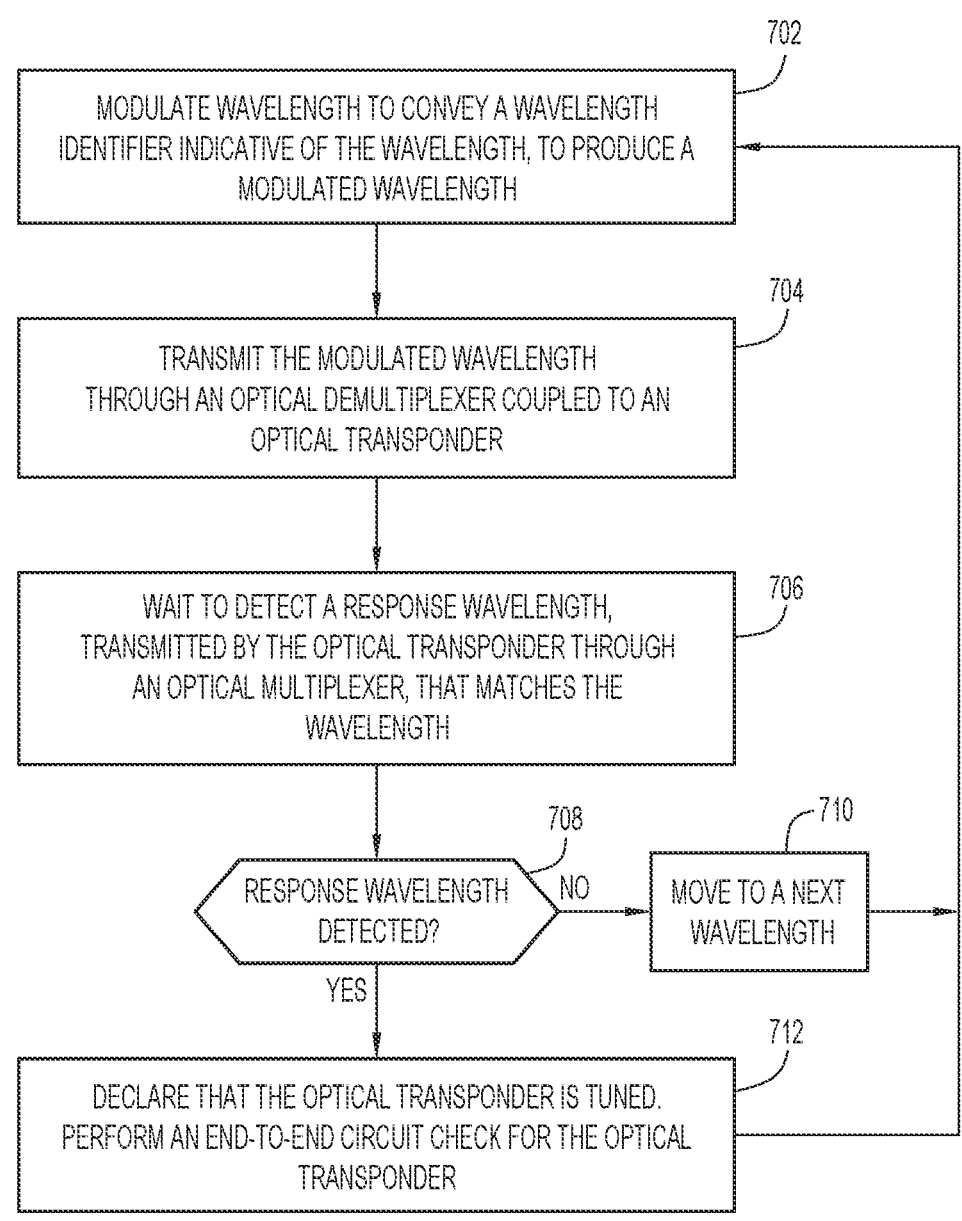

702

MODULATE WAVELENGTH TO CONVEY A WAVELENGTH
IDENTIFIER INDICATIVE OF THE WAVELENGTH, TO PRODUCE A
MODULATED WAVELENGTH

704

TRANSMIT THE MODULATED WAVELENGTH
THROUGH AN OPTICAL DEMULTIPLEXER COUPLED TO AN
OPTICAL TRANSPONDER

706

WAIT TO DETECT A RESPONSE WAVELENGTH,
TRANSMITTED BY THE OPTICAL TRANSPONDER THROUGH
AN OPTICAL MULTIPLEXER, THAT MATCHES THE
WAVELENGTH

708

RESPONSE WAVELENGTH
DETECTED?

NO

710

MOVE TO A NEXT
WAVELENGTH

YES

712

DECLARE THAT THE OPTICAL TRANSPONDER IS TUNED.
PERFORM AN END-TO-END CIRCUIT CHECK FOR THE OPTICAL
TRANSPONDER

FIG.7

AUTO TUNING OF DWDM WAVELENGTH OF TRANSPONDER CONNECTED TO COLORED PASSIVE MULTIPLEXING MODULES

TECHNICAL FIELD

The present disclosure relates generally to optical networks.

BACKGROUND

Wavelength tunable optical transponders deployed at geographically separated optical sites may exchange optical signals with each other through optical wavelength selective (i.e., "colored") input and output ports of colored passive optical multiplexing modules that are connected to the optical transponders over a fiber patch cord. Often, the optical transponders do not know to which of the wavelength selective input and output ports the optical transponders are connected, which means that the optical transponders do not know the correct wavelengths at which to transmit and receive the optical signals to ensure their delivery through the colored passive optical multiplexing modules. That is, the optical transponders may not be tuned to transmit and receive optical signals at the correct wavelengths. A conventional tuning technique includes manually tuning the optical transponders to transmit and receive the optical signals at wavelengths matched to the wavelength selective input and output ports to which the optical transponders are connected; however, this approach is time consuming and inefficient.

BRIEF DESCRIPTION OF THE DRAWINGS

FIG. 7 is a flowchart of another method of auto-tuning an optical transponder performed primarily by the optical terminal, according to an example embodiment.

DETAILED DESCRIPTION

Overview

In an embodiment, a method for auto-tuning an optical transponder that is coupled to an optical terminal is performed. The method comprises: cycling through wavelengths in sequence by, for each wavelength: modulating the wavelength to convey a wavelength identifier of the wavelength, to produce a modulated wavelength that conveys the wavelength identifier; transmitting the modulated wavelength from the optical terminal through an optical demultiplexer that is configured to pass wavelengths to output ports of the optical demultiplexer; waiting to detect a response wavelength, transmitted by the optical transponder, which matches the wavelength; and determining whether to repeat cycling using a next wavelength or to stop cycling based on whether the response wavelength is detected.

Example Embodiments

Figure 1:
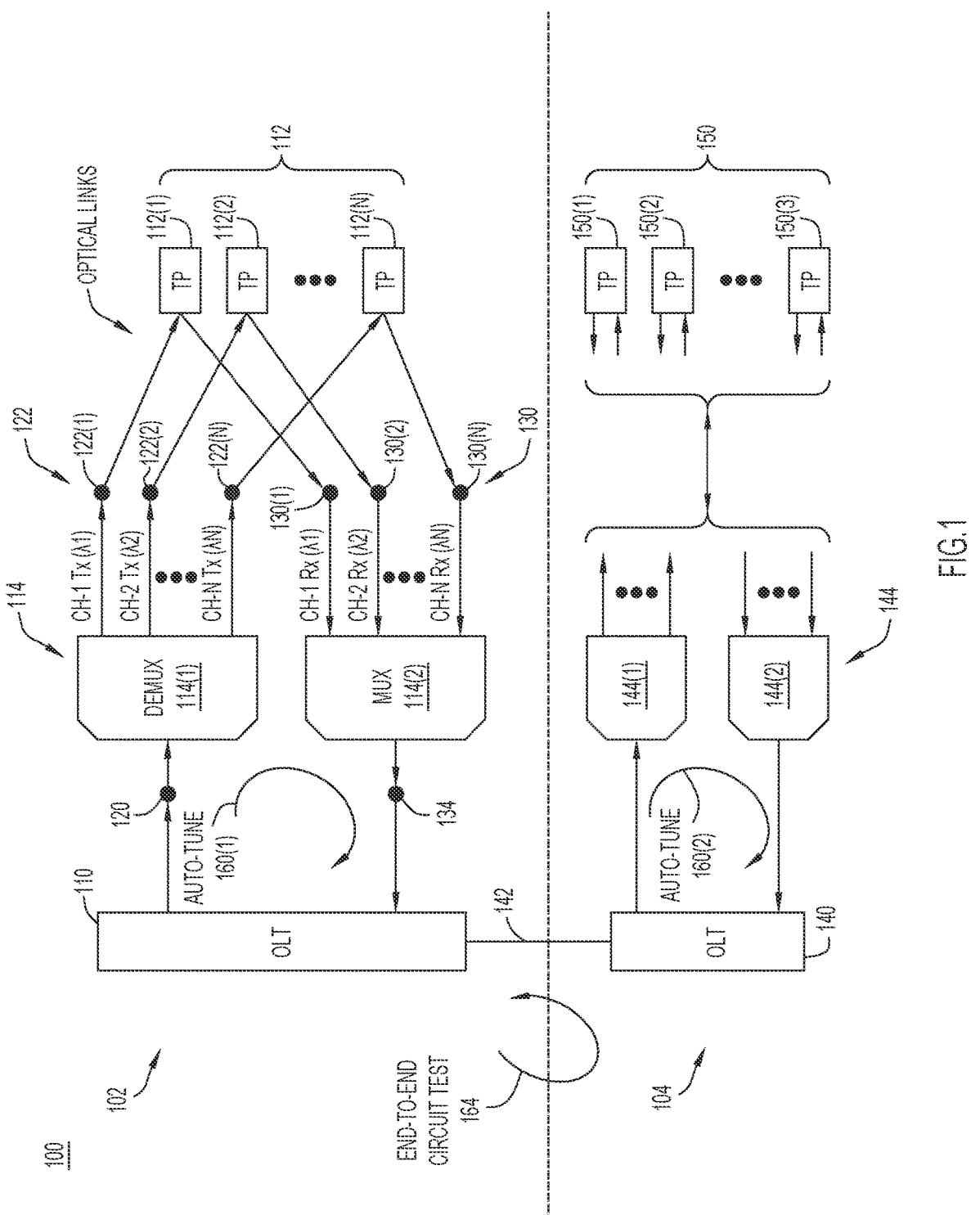
FIG. 1 is a block diagram of an optical network in which embodiments for automatically (auto)-tuning wavelengths at which optical transponders operate may be implemented, according to an example embodiment.

FIG. 1 is a block diagram of an example optical network 100 in which embodiments directed to auto-tuning wavelengths at which optical transponders operate, when the optical transponders are connected to colored passive optical multiplexing modules, may be implemented. Such auto-tuning represents a convenient "plug-and-play" method of tuning the optical transponders. The method advantageously avoids manual intervention and the use of a patch cord connection for tuning. Optical network 100 includes an optical site 102 deployed at a first site location and an optical site 104 deployed at a second site location that is geographically separated from the first site location. Optical sites 102 and 104, including their corresponding optical components described below, may be configured to process, transmit, and receive optical signals having dense wavelength-division multiplexing (DWDM) optical spectrums, for example. For the present description, it is understood that a particular wavelength $\lambda$ corresponds to a particular frequency $f$ through the relationship $f \cdot \lambda = c$, where c is the speed of light. Also, the terms "wavelength" and "frequency" may be used interchangeably, depending on context.

Optical site 102 includes an optical line terminal (OLT) 110 (more generally referred to as an "optical terminal" (OT)), optical transponders (TPs) 112(1)-112(N) (collectively referred to as "optical transponders 112") that may be incorporated into a network device, such as a router (not shown), and colored passive optical multiplexing modules 114 disposed between and optically coupled to the OLT and the optical transponders. An optical transponder is sometimes referred to as an "optical transmitter-receiver" (i.e., "transceiver"). OLT 110 may contain multiple add-drop ports (not shown), as is known. OLT 110 and optical transponders 112 exchange optical signals (also referred to herein as "wavelengths") with each other through colored passive optical multiplexing modules 114.

Colored passive optical multiplexing modules 114 include an optical demultiplexer 114(1) and an optical multiplexer 114(2). Optical demultiplexer 114(1) and optical multiplexer 114(2) may be implemented as athermal arrayed waveguide grating (AAWG) multiplexing modules, for example. Optical demultiplexer 114(1) has an input port 120 optically coupled to OLT 110 and wavelength selective output ports 122(1)-122(N) (collectively referred to as "output ports 122") respectively coupled to optical receivers (shown in FIG. 3A) of optical transponders 112(1)-112(N) through optical connections. Each output port 122($i$) has a filtering bandwidth centered on a distinct wavelength $\lambda i$ (and a corresponding frequency fi). Thus, optical demultiplexer 114(1) passes wavelength $\lambda i$ from input port 120 only to output port 122($i$). More generally, optical demultiplexer 114(1) passes (i.e., demultiplexes) wavelengths $\lambda 1$-$\lambda N$, transmitted by OLT 110 to input port 120, from the input port to respective output ports 122(1)-122(N), and on to respective optical transponders 112(1)-112(N). Output ports 122 (1)-122(N) represent wavelength selective output channels Ch-1 Tx ($\lambda 1$)-Ch-N Tx ($\lambda N$) of optical demultiplexer 114(1).

Similarly, optical multiplexer 114(2) has wavelength selective input ports 130(1)-130(N) (collectively referred to as "input ports 130") respectively coupled to optical transmitters (shown in FIG. 3A) of optical transponders 112(1)-112(N) over optical connections, and an output port 134 optically coupled to OLT 110. Each input port 130($i$) has a filtering bandwidth centered on a distinct wavelength $\lambda i$ (and corresponding frequency fi). Thus, optical multiplexer 114 (2) passes only wavelength $\lambda i$ from input port 130($i$) to output port 134. More generally, optical multiplexer 114(2) passes (i.e., multiplexes) wavelengths $\lambda 1$-$\lambda N$ transmitted to input ports 130(1)-130(N) by optical transponders 112(1)-112(N), from the input ports to output port 134, and on to OLT 110. Input ports 130(1)-130(N) represent wavelength selective input channels Ch-1 Rx ($\lambda 1$) Ch-N Rx ($\lambda N$) of optical multiplexer 114(2).

Optical site 104 includes an OLT 140 configured to exchange optical signals with OLT 110 over an optical fiber 142 coupled to the two OLTs, colored passive optical multiplexing modules 144 including an optical demultiplexer 144(1) and an optical multiplexer 144(2) optically coupled to OLT 140, and optical transponders 150(1)-150 (N) (collectively referred to as "optical transponders 150") optically coupled to the colored passive optical multiplexing modules 144. Optical site 104 is configured and operates similarly to optical site 102. Therefore, the description of optical site 102 shall suffice for optical site 104.

Returning to optical site 102, in order to exchange optical signals (i.e., wavelengths) with OLT 110 or other optical transponders (for example, with far-end optical transponders 150) through colored passive optical multiplexing modules 114, optical transponders 112 tune their transmit and receive wavelengths to the selective wavelengths of input ports 130 and output ports 122, respectively, of the colored passive optical multiplexing modules to which the optical transponders are connected. For example, optical transponder 112(2) tunes its optical transmitter to transmit wavelength $\lambda 2$ and tunes its optical receiver to receive wavelength $\lambda 2$. In some situations, however, the optical transponders 112 may not know to which of output ports 122 and to which of input ports 130 the optical transponders are connected. Therefore, optical transponders 112 may not know to which transmit wavelengths and to which receive wavelengths to tune. Such lack of awareness on the part of optical transponders 112 may arise when the optical transponders are initially deployed (i.e., initially connected to various input and output ports of colored passive optical multiplexing modules 114) or when the optical transponders lose their operating configurations for some reason.

Accordingly, embodiments presented herein perform auto-tuning of optical transponders 112 through colored passive optical multiplexing modules 114 to configure the optical transponders with information that enables the optical transponders to tune their transmit and receive wavelengths to match the selective wavelengths of the input ports and the output ports to which the optical transponders are connected. Optical sites 102 and 104 may each perform auto-tuning (indicated generally at 160(1) and 160(2)) to tune respective optical transponders 112 and 150. Optical sites 102 and 104 may perform auto-tuning independently of and in parallel with each other. Once optical sites 102 and 104 have auto-tuned optical transponders 112 and 150, optical transponders 112 and 150 may engage in end-to-end circuit tests (indicated generally at 164), over optical fiber 142 between OLTs 110 and 140.

Figure 2:
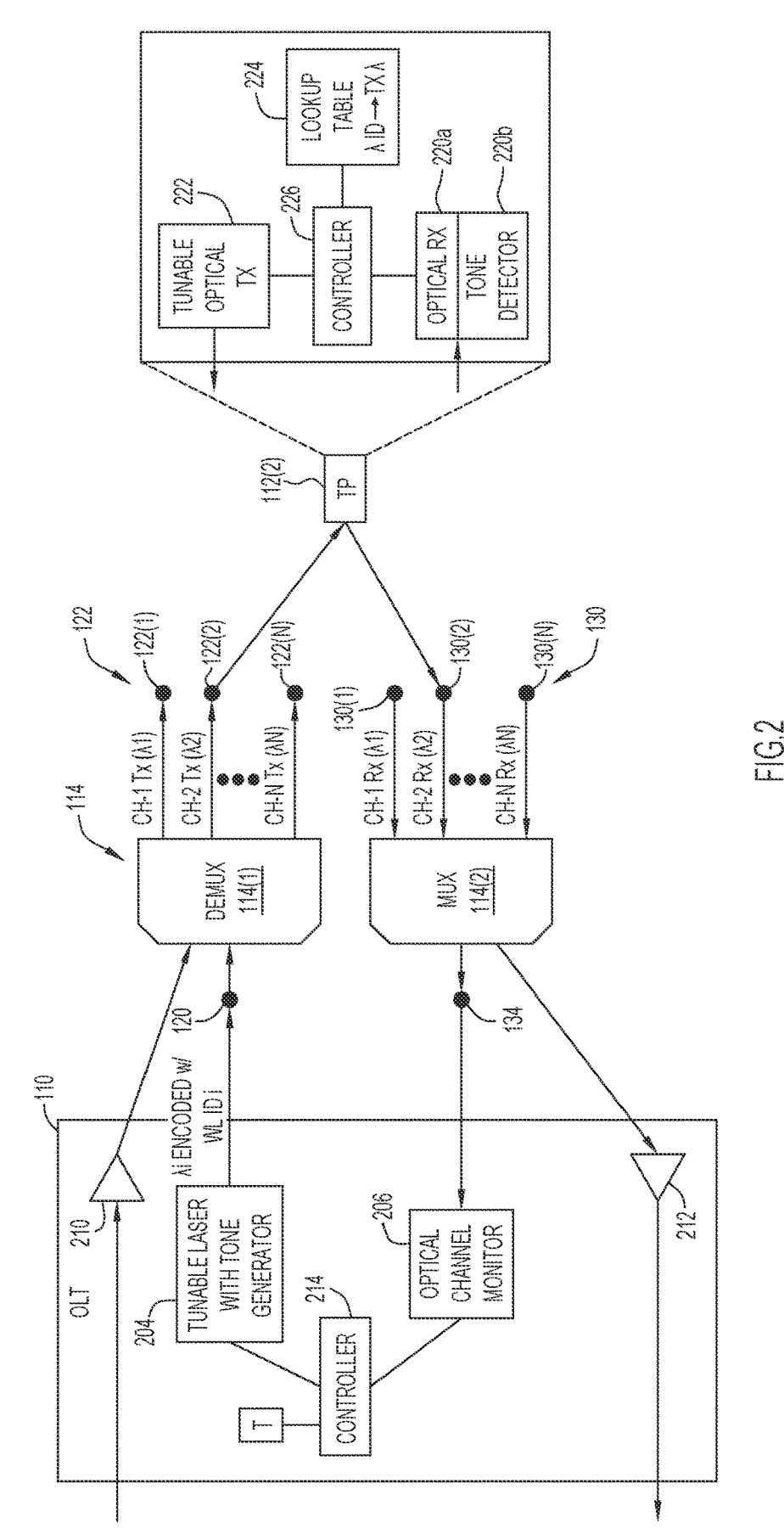
FIG. 2 is a block diagram of an optical site from FIG. 1 that shows details of an optical terminal and an optical transponder useful for describing operations used to perform the auto-tuning, according to an example embodiment.

FIG. 2 is a block diagram of optical site 102 that shows details of OLT 110 and optical transponder 112(2) useful for describing operations used to perform auto-tuning, according to an embodiment. Each optical transponder 112($i$) may be configured similarly to optical transponder 112(2). OLT 110 includes a tunable laser and tone generator module 204, an optical channel monitor (OCM) 206, an optical amplifier 210 (e.g., an Erbium-doped fiber amplifier (EDFA)), an optical amplifier 212 (e.g., an EDFA booster amplifier), and a controller 214 coupled to and configured to control the aforementioned components. Controller 214 has access to a lookup table T preconfigured to map wavelengths $\lambda 1$-$\lambda N$ to corresponding wavelength numbers or identifiers (IDs) 1-N (or other identifiers) indicative of the wavelengths. Table 1 below lists several example entries of lookup table T.

TABLE 1

| Wavelength Entry No. | Wavelength ID (ASCII) | Frequency (THz) corresponding to Wavelength |
|---|---|---|
| $\lambda 1$ | 48 49 | 19610000 |
| $\lambda 2$ | 48 50 | 19602500 |
| $\lambda 3$ | 48 51 | 19595000 |

FIG. 2 depicts OCM 206 as part of OLT 110 by way of example, only. In other examples, OCM 206 may be external to OLT 110, provided that the OCM can communicate with controller 214.

In an add-drop transmit direction, controller 214 commands tunable laser and tone generator module 204 to tune to a wavelength $\lambda i$ (e.g., any of wavelengths $\lambda 1$-$\lambda N$) and tone modulate the wavelength $\lambda i$ with a tone pattern representative of a wavelength (WL) ID (WL ID) "i" indicative of the wavelength, to produce a modulated wavelength that carries or conveys the WL ID. Tunable laser and tone generator module 204 provides the modulated wavelength to input port 120 of optical demultiplexer 114(1) for transmission through the optical demultiplexer. Optical amplifier 210 amplifies "pass-through" optical signals transiting OLT 110 in the add-drop transmit direction.

In an add-drop receive direction, OCM 206 receives optical energy from output port 134 of optical multiplexer 114(2). Controller 214 commands OCM 206 to search for optical energy in an optical bandwidth or channel (also referred to as an "OCM slice") that is centered on a selected (i.e., particular) wavelength, i.e., to detect whether the particular wavelength is present in the channel. In other words, OCM 206 detects the presence of optical power in the OCM slices. When OCM 206 detects the selected wavelength, the OCM provides, to controller 214, a signal indicating that the selected wavelength is detected/present. Optical amplifier 212 amplifies pass-through optical signals transiting OLT 110 in the add-drop receive direction.

Optical transponder 112(2) includes a tunable optical receiver (RX) 220$a$ and a tone detector 220$b$ connected to output port 122(2) of optical demultiplexer 114(1), a tunable optical transmitter (TX) 222 connected to input port 130(2) of optical multiplexer 114(2), a lookup table 224 (e.g., Table 1 described above), and a controller 226 coupled to and configured to control the aforementioned components.

Lookup table 224 is preconfigured with mappings of WL IDs 1-N to tune words for corresponding wavelengths $\lambda 1-\lambda N$ to which optical receiver 220a and optical transmitter 222 may be tuned responsive to commands from controller 226. In one non-limiting example, optical transponder 112 (2) includes a pluggable optical module capable of coherent operation with DWDM signals, such as an CFP2-DCO/ZR/ coherent module having a wavelength tuning resolution of approximately 100 MHz over a frequency ranging from 191 THz to 196 THz. Many other types of optical transponders are possible.

Various methods are described below in connection with FIGS. 3A-7, which are described also with continued reference to FIGS. 1 and 2.

Figure 3A:
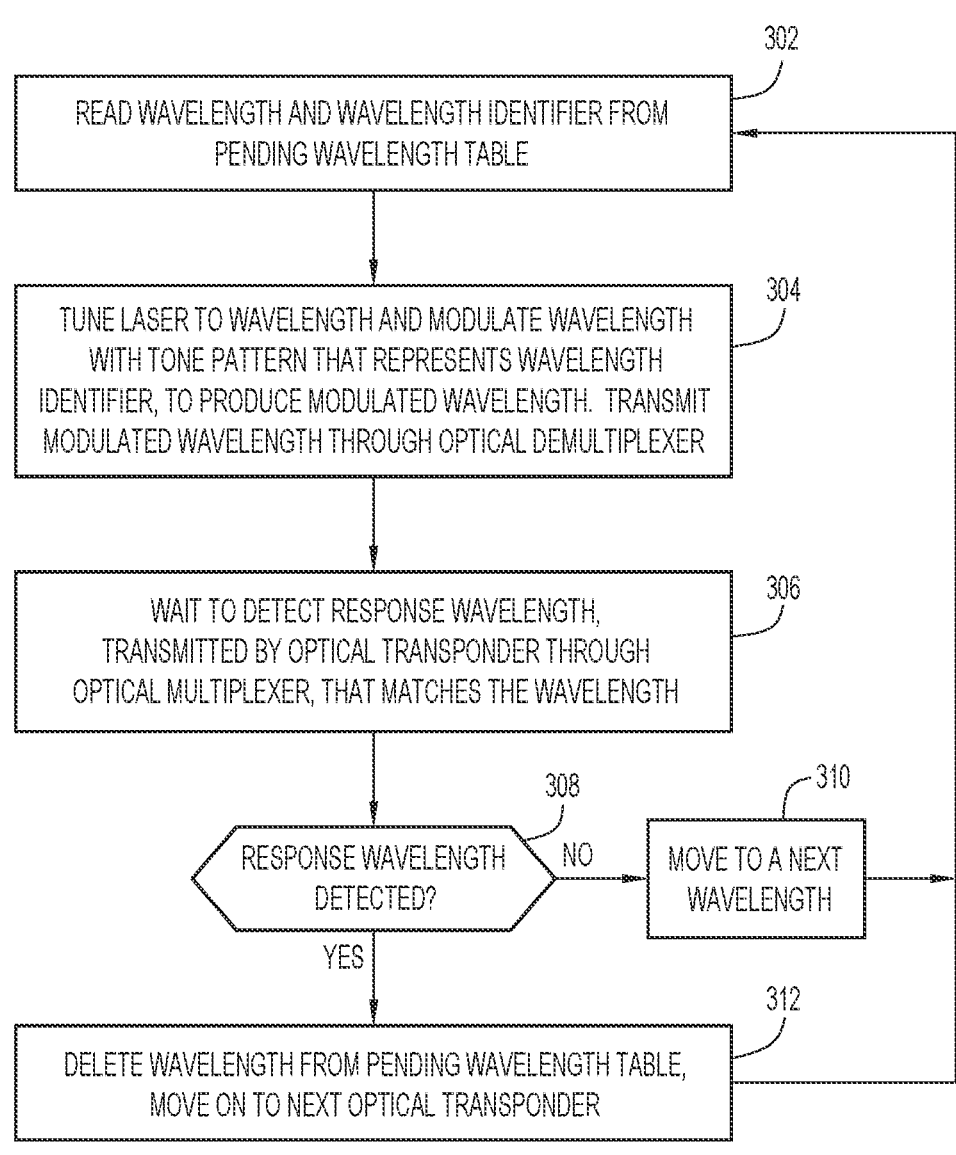
FIG. 3A is a flowchart of a method of auto-tuning optical transponders performed primarily by the optical terminal, according to an example embodiment.

FIG. 3A is a flowchart of a method 300 of auto-tuning optical transponders 112 performed primarily by OLT 110 in optical site 102. That is, method 300 is presented from the perspective of OLT 110. In optical site 104, OLT 140 similarly performs method 300 to tune optical transponders 150.

OLT 110 maintains a pending wavelength table of unallocated or untuned wavelengths, corresponding to untuned ones of optical transponders 112. The pending wavelength table includes entries that map the untuned wavelengths to their WL IDs, similar to lookup table T. Initially, the pending wavelength table has entries for all of wavelengths $\lambda 1-\lambda N$ (i.e., the pending wavelength table is full) because optical transponders 112(1)-112(N) have not been tuned to corresponding wavelengths listed in the table.

Method 300 assume that, when optical transponder 112(i) receives a modulated wavelength $\lambda i$ transmitted by OLT 110 through optical demultiplexer 114(1), the optical transponder recovers WL ID i from the modulated wavelength and uses it to tune the optical transmitter of the optical transponder to transmit wavelength $\lambda i$ back to the OLT through optical multiplexer 114(2), as a "response wavelength."

At 302, controller 214 accesses an entry in the pending wavelength table for wavelength $\lambda i$ that contains WL ID i. In a first iteration through operation 302, controller 214 access a first entry in the pending wavelength table for wavelength $\lambda 1$ that contains a wavelength identifier for wavelength $\lambda 1$. In subsequent successive iterations through operation 302, controller 214 accesses successive entries in the pending wavelength table, thereby cycling through the wavelengths in the successive iterations, as described further below.

At 304, controller 214 commands tunable laser and tone generator module 204 to tune to wavelength $\lambda i$ and tone modulate the wavelength with a tone pattern corresponding to the wavelength identifier i for wavelength $\lambda i$. In response, tunable laser and tone generator module 204 tunes to wavelength $\lambda i$ and tone modulates that wavelength with the tone pattern for wavelength identifier i, to produce a modulated wavelength $\lambda i$ that carries the tone pattern. Tunable laser and tone generator module 204 transmits the modulated wavelength $\lambda i$ through optical demultiplexer 114(1). That is, optical demultiplexer 114(1) passes the modulated wavelength $\lambda i$ from input port 120 only to output port 122(i) centered on wavelength $\lambda i$, and on to optical transponder 112(i). Optical transponder 112(i) receives the modulated wavelength.

At 306, controller 214 commands OCM 206 to search for/detect optical energy (i.e., the response wavelength), transmitted by one of optical transponders 112 through optical multiplexer 114(1), that matches wavelength $\lambda i$. Accordingly, OCM 206 detects whether there is optical energy from one of optical transponders 112 that is centered on wavelength $\lambda i$. Controller 214 waits a predetermined time period to receive, from OCM 206, an indication that the response wavelength that matches wavelength $\lambda i$ is present. The indication that the response wavelength matches wavelength $\lambda i$ is an indication that the optical transponder is tuned to wavelength $\lambda i$. Flow proceeds to 308.

At 308, controller 214 determines whether the indication that the response wavelength matches wavelength $\lambda i$ is received within the predetermined time period. When the indication that the response wavelength matches wavelength $\lambda i$ is not received within the predetermined time period (indicating that no optical transponder has tuned to that wavelength), flow proceeds to 310, where controller 214 advances to the next entry/wavelength in the pending wavelength table. From 310, flow returns to 302 to repeat or iterate through operations 302-306 using the next wavelength. The iterations represent an inner loop of method 300 that cycles through the wavelengths in the pending wavelength table to auto-tune a particular one of optical transponders 112 (e.g., optical transponder 112(i)).

When an indication that the response wavelength matches wavelength $\lambda i$ is received within the predetermined time period (indicating that optical transponder 112(i) is tuned successfully to wavelength $\lambda i$), flow proceeds to 312, where controller 214 deletes wavelength $\lambda i$ from the pending wavelength table because that wavelength is tuned. Flow proceeds from 312 to 302 to repeat operations 302-306, but without access to previously tuned wavelength $\lambda i$ in the pending wavelength table. This represents an outer loop of method 300 that cycles through the wavelengths in the pending wavelength table to auto-tune a next one of optical transponders 112.

The inner and outer loops described above repeat until the pending wavelength table is empty and all of optical transponders 112(1)-112(N) have been tuned successfully to corresponding wavelengths $\lambda 1-\lambda N$.

Figure 3B:
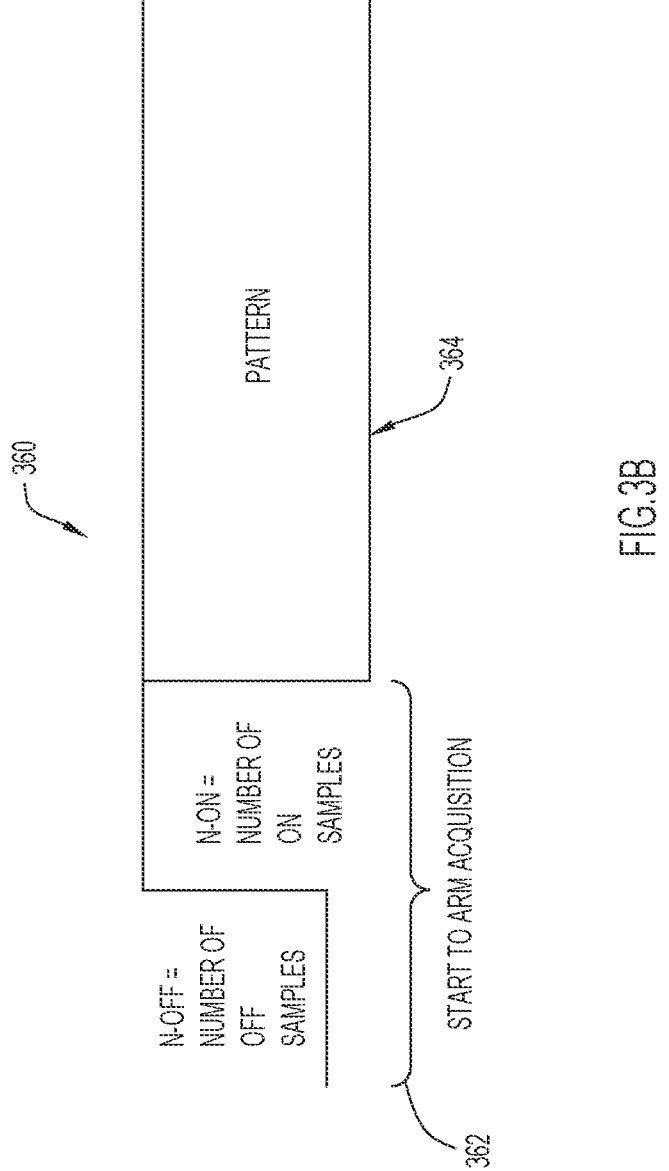
FIG. 3B is an illustration of a data word used to tone modulate a wavelength with a wavelength identifier, according to an example embodiment.

FIG. 3B is an illustration of an example data word 360 used to tone modulate a wavelength with a wavelength identifier to produce a modulated wavelength. Data word 360 includes a start or preamble 362 followed by a pattern 364, which may comprise a number of data bytes. Preamble 362 arms acquisition of the modulated wavelength in an optical transponder. Preamble 362 includes a number N-off of OFF samples followed by a number N-on of ON samples. Pattern 364 includes a digital code representative of a wavelength identifier for the wavelength to be modulated.

Figure 4:
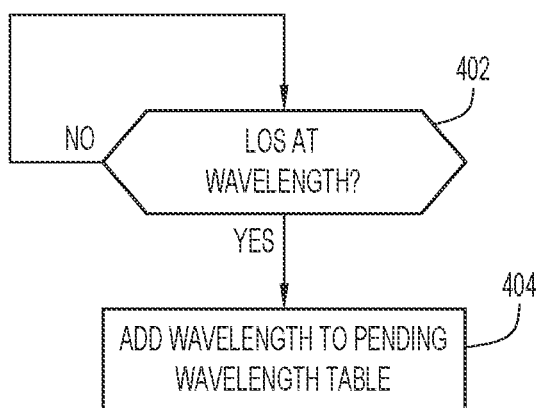
FIG. 4 is a flowchart of a method performed by the optical terminal in the background while the method of FIG. 3A is performed, according to an example embodiment.

FIG. 4 is a flowchart of an example method 400 performed by OLT 110 in the background while method 300 is performed. At 402, OCM 206 scans OCM slices centered on the tuned wavelengths (i.e., wavelengths that have been deleted from the pending wavelength table) looking for a loss-of-signal (LOS). The LOS may arise from optical fiber breaks between colored passive optical multiplexing modules 114 and the tuned optical transponders, or failures of the tuned optical transponders. When no LOS is detected, flow returns to 402. On the other hand, when an LOS is detected on a particular tuned wavelength, indicating that the particular tuned wavelength may no longer be tuned, flow proceeds to 404, where controller 214 adds the particular wavelength to the pending wavelength table. This causes method 300 to repeat auto-tuning operations with respect to the added wavelength, i.e., to re-auto-tune the added wavelength.

Figure 5:
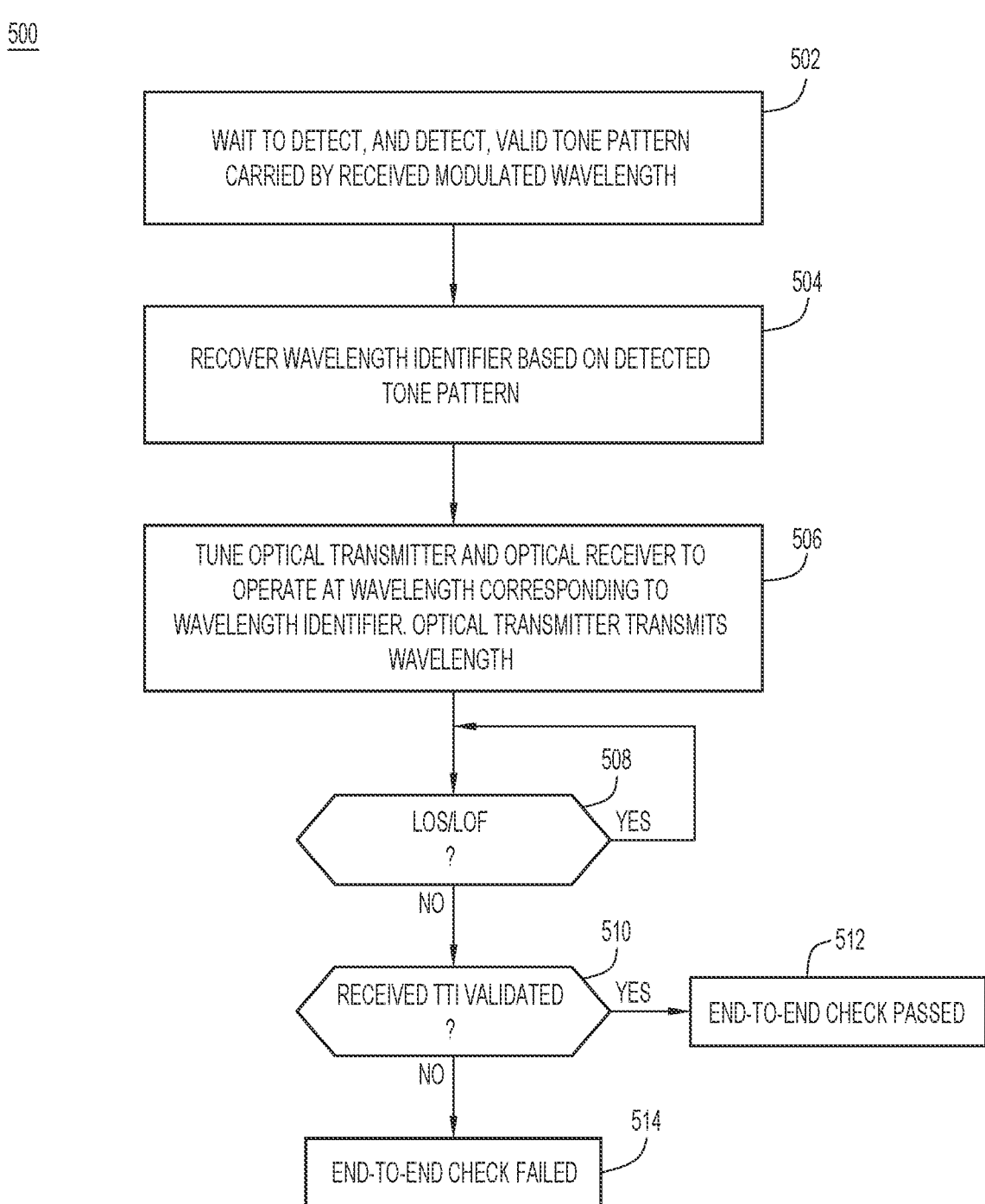
FIG. 5 is a flowchart of a method performed by the optical transponder in connection with the method of FIG. 3A, according to an example embodiment.

FIG. 5 is a flowchart of an example method 500 performed by each optical transponder 112(i) in connection with method 300 performed by OLT 110. Method 500 may also be performed by each optical transponder 150(*i*) in optical site 104.

Upon power-on of optical transponder 112(*i*), at 502, tone detector 220*b* operates in a tone detection mode and waits to receive a modulated wavelength encoded with a tone pattern indicative of a wavelength identifier.

At 504, tone detector 220*b* receives the modulated wavelength (e.g., 2*i*), detects the tone pattern indicative of the WL ID (e.g., WL ID i), and provides the same to controller 226. Controller 226 retrieves a tune word indicative of λi (e.g., a wavelength descriptor) from lookup table 224 based on the WL ID i.

At 506, controller 226 configures (e.g., tunes) optical receiver 220*a* and optical transmitter 222 to operate at wavelength λi using the tune word. At this time, optical transponder 112(*i*) is considered tuned to wavelength λi. Optical transmitter 222 transmits (tuned) wavelength λi to OLT 110 through optical multiplexer 114(2).

Once optical transponder 112(*i*) of optical site 102 is tuned, an optional end-to-end circuit or continuity check between optical transponder 112(*i*) and a far-end optical transponder 150(*i*) in optical site 104 may be performed using next operations 508-514. The end-to-end circuit check assumes that (i) OLT 110 and OLT 140 are connected over optical fiber 142, and (ii) optical transponders 150 have been auto-tuned and are able to participate in the end-to-end circuit check.

At 508, optical transponder 112(*i*) tunes its optical receiver to detect (received) wavelength λi transmitted by the far-end optical transponder, and operates in an LOS or loss-of-frame (LOF) condition that repeatedly checks for the LOS/LOF. The LOS/LOF is an indication that wavelength λi (as transmitted by the far-end optical transponder) has not been received. While the LOS/LOF persists, flow returns to 508. When wavelength λi is detected, flow proceeds to 510.

At 510, optical transponder 112(*i*) waits to receive, from the far-end optical transponder, a stream of optical frames that include a trail trace identifier (TTI). The TTI includes remote port configuration information for optical transponder 150(*i*). When the TTI is received, optical transponder 112(*i*) validates the TTI against configuration information that is expected for the far-end optical transponder. In another example, the validation may employ a link layer discovery protocol (LLDP). When validation is successful, flow proceeds to 512, where optical transponder 112(*i*) declares that the end-to-end circuit check is complete and successful. When validation is unsuccessful/fails, flow proceeds to 514, where optical transponder 112(*i*) declares that the end-to-end circuit check failed.

Figure 6:
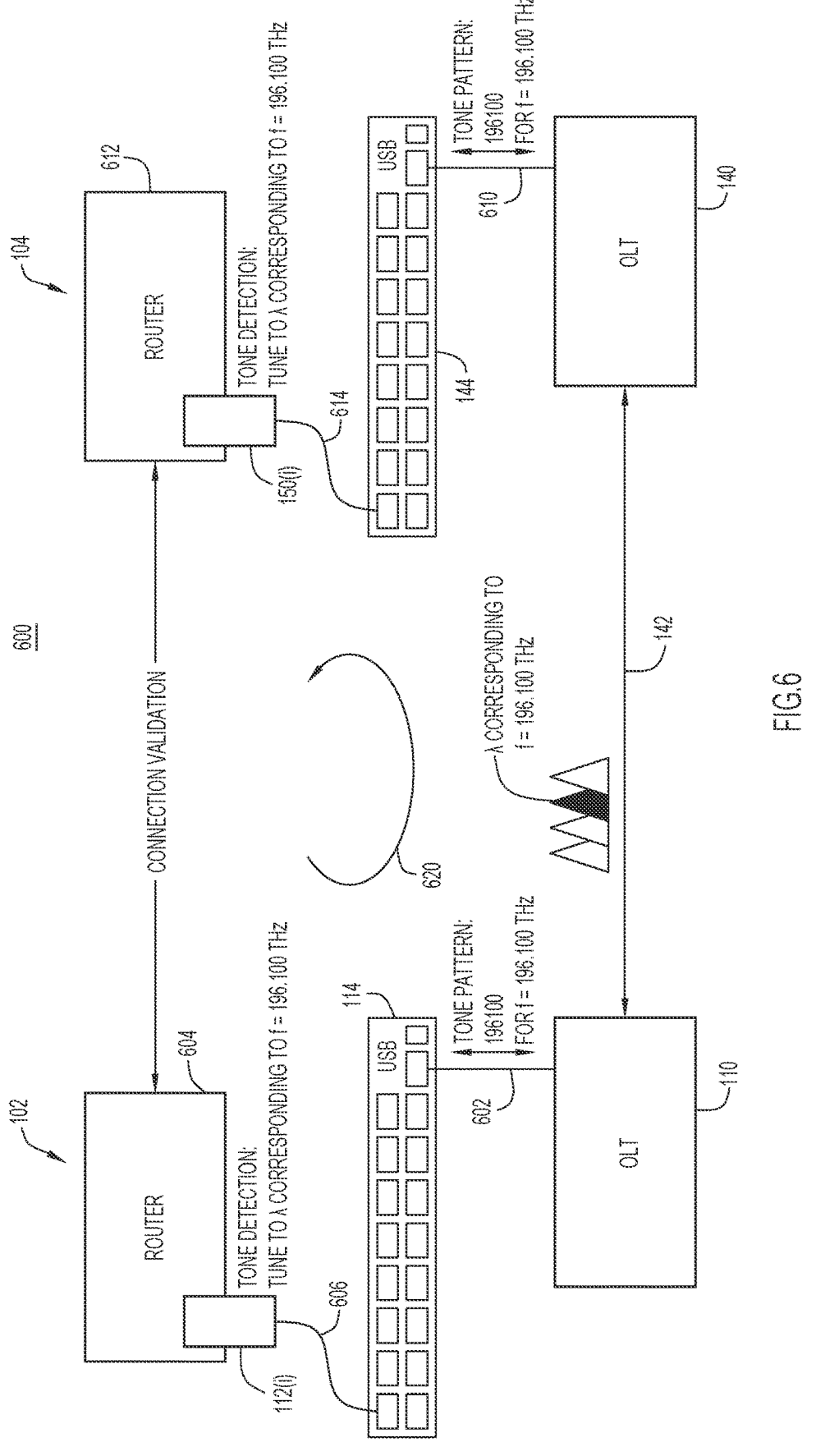
FIG. 6 is a diagram of an arrangement of components in the optical network used to perform an end-to-end circuit check between optical transponders after the optical transponders have been auto-tuned, according to an example embodiment.

FIG. 6 is a diagram of an example configuration 600 in optical network 100 used for an end-to-end circuit check (also referred to as "connection validation") after optical sites 102 and 104 have each performed auto-tuning of their respective optical transponders. As shown by way of example in FIG. 6, OLT 110 of optical site 102 is connected to OLT of optical site 104 over optical fiber 142. OLT 110 is coupled to colored passive optical multiplexing modules 114 over a fiber patch cord 602, and optical transponder 112(*i*) (plugged into a router 604) is coupled to the colored passive optical multiplexing modules over a fiber patch cord 606. Similarly, OLT 140 is coupled to colored passive optical multiplexing modules 144 over a fiber patch cord 610, and optical transponder 150(*i*) (plugged into a router 612) is coupled to the colored passive optical multiplexing modules over a fiber patch cord 614.

According to the end-to-end circuit check, optical transponder 112(*i*) and optical transponder 150(*i*) exchange optical signals with each other (i.e., each of the optical transponders transmits and receives the optical signals) at an example wavelength corresponding to a frequency of 196.100 THz. The optical signals traverse end-to-end optical path 620 encompassing the above-described optical components. Optical transponder 112(*i*) and optical transponder 150(*i*) each detect the optical signal including the TTI transmitted by the far-end optical transponder, thereby validating the end-to-end path.

FIG. 7 is a flowchart of another example method 700 of auto-tuning an optical transponder (e.g., optical transponder 112(*i*)) that is coupled to an optical terminal (e.g., OLT 110). Support for operations of method 700 is provided above. The optical terminal is coupled to an input (e.g., input port 120) of a colored passive optical demultiplexer (e.g., optical demultiplexer 114(1)) configured to pass (optical) wavelengths selectively from the input to corresponding ones of output ports of the optical demultiplexer. The optical terminal is also coupled to an output (e.g., output port 134) of a colored passive optical multiplexer (e.g., optical multiplexer 114(2)) configured to pass the wavelengths selectively from corresponding ones of input ports of the optical demultiplexer to the optical terminal. Method 700 auto-tunes the optical transponder, which includes (i) an optical receiver that is coupled to the optical terminal through one of the output ports, and (ii) an optical transmitter that is coupled to the optical terminal through one of the input ports.

At 702, the optical terminal selects a wavelength of the wavelengths and modulates the wavelength to convey a wavelength identifier of the wavelength, to produce a modulated wavelength that conveys the wavelength identifier. The modulating may include tone modulating the wavelength with a tone pattern indicative of the wavelength identifier. In the examples above, controller 214 controls or causes tunable laser and tone generator module 204 to modulate the wavelength with the wavelength identifier.

At 704, the optical terminal transmits the modulated wavelength through the optical demultiplexer. In the examples above, controller 214 controls or causes tunable laser and tone generator module 204 to transmit the modulated wavelength.

At 706, the optical terminal waits a predetermined time period to detect a response wavelength, transmitted by the optical transponder through the optical multiplexer, which matches the wavelength. In the examples above, controller 214 causes OCM 206 to attempt to detect the response wavelength.

At 708, the optical terminal determines, based on whether the response wavelength is detected, whether to repeat operations 702-706 using a next wavelength of the wavelengths because the optical transponder is tuned or not to repeat operations 702-706 because the optical transponder is tuned. More specifically, when the response wavelength is not detected within the predetermined time period, which indicates that the optical transponder is not tuned, flow proceeds to 710, where the optical terminal moves to the next wavelength and then repeats operations 702-706 using the next wavelength. Repeating operations 702-706 using the next wavelength is referred to as "cycling through the wavelengths in sequence."

On the other hand, when the response wavelength is detected within the predetermined time period, which indicates that the optical transponder is tuned, flow proceeds to 712. At 712, the optical terminal declares that the optical transponder is tuned to the wavelength. Optionally, an end-to-end circuit check between the tuned optical transponder and a far-end optical transponder may be performed through the optical terminal.

In an arrangement in which multiple optical transponders are coupled to the optical terminal through multiple output ports of the output ports and multiple input ports of the input ports, the optical terminal may repeat method 700 for each of the multiple optical transponders in sequence. In that case, the multiple optical transponders may be tuned to corresponding ones of multiple wavelengths of the wavelengths.

The optical transponder performs the following operations that mirror or are in response to the operations performed by the optical terminal:

a. Upon receiving the modulated wavelength via the optical receiver, recover the wavelength identifier.

b. Access a wavelength tune word corresponding to the wavelength, based on the wavelength identifier.

c. Tune the optical transmitter and the optical receiver to operate at the wavelength based on the wavelength tune word.

d. By the optical transmitter, transmit the wavelength to the optical terminal through the optical multiplexer.

Figure 8:
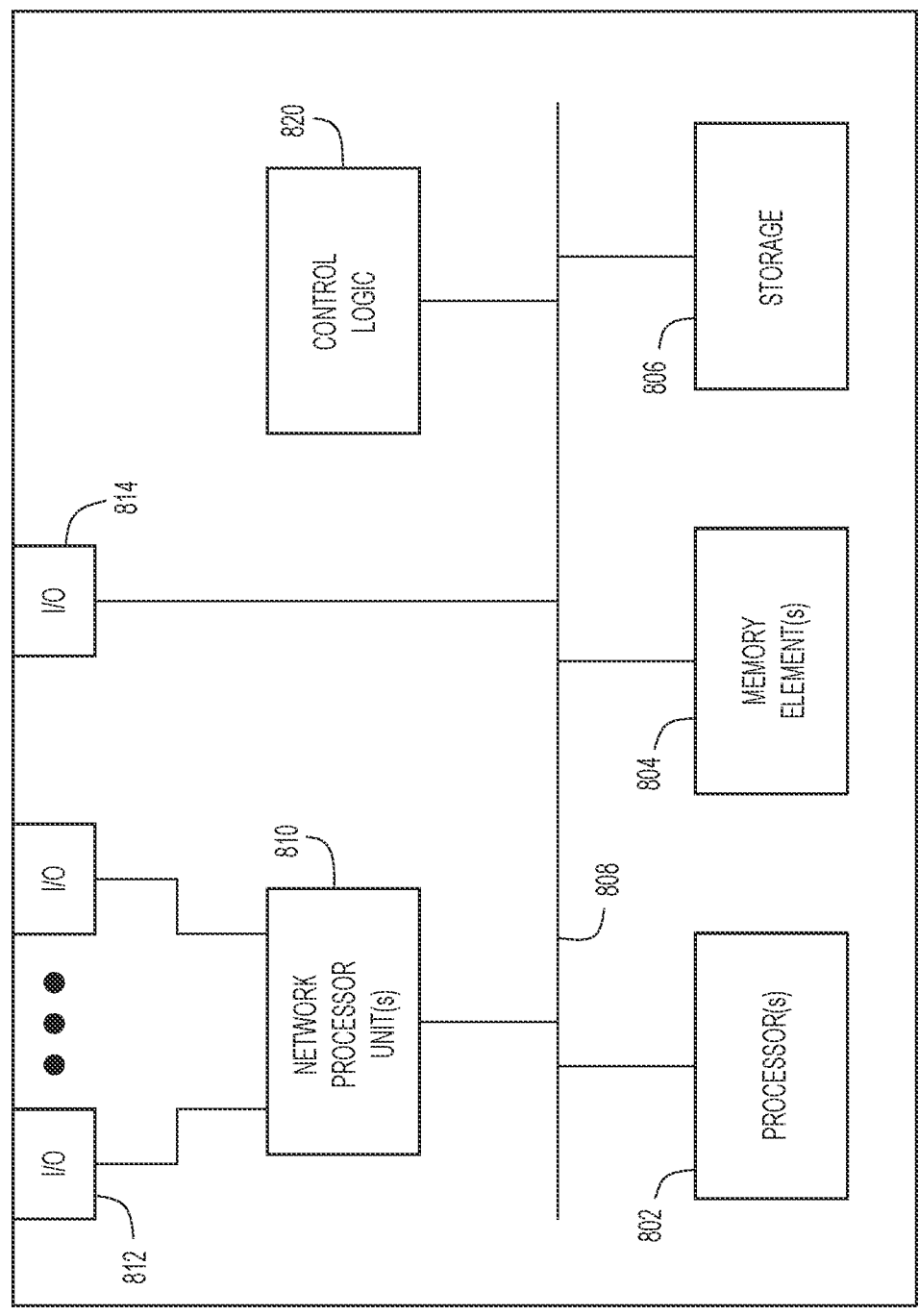
FIG. 8 illustrates a hardware block diagram of a computing device that may perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. For example, computing device 800 may represent portions of an optical terminal including a controller of the optical terminal and portions of an optical transponder including a controller of the optical transponder. Alternatively, the optical terminal or the optical transponder may be incorporated into components of computing device 800.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element (s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In some aspects, the techniques described herein relate to a method of auto-tuning an optical transponder coupled to an optical terminal, including: cycling through wavelengths in sequence by, for each wavelength: modulating the wavelength to convey a wavelength identifier of the wavelength, to produce a modulated wavelength that conveys the wavelength identifier; transmitting the modulated wavelength from the optical terminal through an optical demultiplexer that is configured to pass wavelengths to output ports of the optical demultiplexer; waiting to detect a response wavelength, transmitted by the optical transponder, which matches the wavelength; and determining, based on whether the response wavelength is detected, whether to repeat cycling using a next wavelength because the optical transponder is not tuned or to stop cycling because the optical transponder is tuned.

In some aspects, the techniques described herein relate to a method, wherein determining whether to repeat cycling with the next wavelength or to stop cycling includes: when the response wavelength is not detected, which indicates that the optical transponder is not tuned, repeating cycling using the next wavelength; and when the response wavelength is detected, which indicates that the optical transponder is tuned, stopping cycling.

In some aspects, the techniques described herein relate to a method, wherein: waiting to detect the response wavelength includes waiting to detect the response wavelength only for a predetermined period of time; and determining includes determining whether to repeat cycling using the next wavelength or to stop cycling based on whether the response wavelength is detected within the predetermined period of time.

In some aspects, the techniques described herein relate to a method, wherein: the optical demultiplexer is configured to pass the wavelengths selectively from an input port of the optical demultiplexer that is coupled to the optical terminal to corresponding ones of the output ports of the optical demultiplexer; an optical multiplexer to pass the wavelengths selectively from corresponding ones of input ports of the optical multiplexer to an output port of the optical multiplexer that is coupled to the optical terminal; transmitting includes transmitting the modulated wavelength through one of the output ports of the optical demultiplexer that corresponds to the wavelength; and waiting to detect the response wavelength includes waiting to detect the response wavelength through one of the input ports of the optical multiplexer that corresponds to the wavelength.

In some aspects, the techniques described herein relate to a method, wherein: modulating includes tone modulating the wavelength with a tone pattern indicative of the wavelength identifier.

In some aspects, the techniques described herein relate to a method, further including multiple optical transponders coupled to the optical terminal through multiple output ports of the output ports of the optical demultiplexer, and the method further includes: repeating auto-tuning for each of the multiple optical transponders.

In some aspects, the techniques described herein relate to a method, wherein the optical transponder includes an optical receiver and a tone detector coupled to one of the output ports of the optical demultiplexer, and an optical transmitter coupled to an input port of input ports of a multiplexer having an output port coupled to the optical terminal, and the method further includes, at the optical transponder: upon receiving the modulated wavelength via the tone detector, recovering the wavelength identifier; and tuning the optical transmitter and the optical receiver to operate at the wavelength based on the wavelength identifier.

In some aspects, the techniques described herein relate to a method, further including, at the optical transponder: by the optical transmitter, after tuning, transmitting the wavelength.

In some aspects, the techniques described herein relate to a method, further including: when the wavelength is detected, which indicates that the optical transponder is tuned, performing an end-to-end circuit check for the optical transponder, the end-to-end circuit check including exchanging optical frames using the wavelength with a far-end optical transponder through the optical terminal.

In some aspects, the techniques described herein relate to a method, wherein the optical transponder includes an optical receiver and an optical transmitter that are each configured to process optical signals having a dense wavelength-division multiplexing (DWDM) spectrum.

In some aspects, the techniques described herein relate to an apparatus including: a tunable laser and tone generator module; an optical channel monitor; and a controller configured to control the tunable laser and tone generator module and the optical channel monitor to auto-tune an optical transponder that is coupled to the apparatus by: cycling through wavelengths in sequence by, for each wavelength: causing the tunable laser and tone generator module to modulate the wavelength to convey a wavelength identifier of the wavelength, to produce a modulated wavelength that conveys the wavelength identifier; causing the tunable laser and tone generator module to transmit the modulated wavelength through an optical demultiplexer that is configured to pass wavelengths to output ports of the optical demultiplexer; waiting for the optical channel monitor to detect a response wavelength, transmitted by the optical transponder, which matches the wavelength; and determining, based on whether the response wavelength is detected, whether to repeat cycling using a next wavelength because the optical transponder is not tuned or to stop cycling because the optical transponder is tuned.

In some aspects, the techniques described herein relate to an apparatus, wherein the controller is configured to perform determining whether to repeat cycling with the next wavelength or to stop cycling by: when the response wavelength is not detected, which indicates that the optical transponder is not tuned, repeating cycling using the next wavelength; and when the response wavelength is detected, which indicates that the optical transponder is tuned, stopping cycling.

In some aspects, the techniques described herein relate to an apparatus, wherein: the controller is configured to perform waiting by waiting for the optical channel monitor to detect the response wavelength only for a predetermined period of time; and the controller is configured to perform determining by determining whether to repeat cycling using the next wavelength or to stop cycling based on whether the response wavelength is detected within the predetermined period of time.

In some aspects, the techniques described herein relate to an apparatus, wherein: the optical demultiplexer is configured to pass the wavelengths selectively from an input port of the optical demultiplexer that is coupled to the apparatus to corresponding ones of the output ports of the optical demultiplexer; an optical multiplexer to pass the wavelengths selectively from corresponding ones of input ports of the optical multiplexer to an output port of the optical multiplexer that is coupled to the apparatus; the tunable laser and tone generator module is configured to transmit the modulated wavelength through one of the output ports of the optical demultiplexer that corresponds to the wavelength; and the controller is configured to perform waiting by waiting to detect the response wavelength through one of the input ports of the optical multiplexer that corresponds to the wavelength.

In some aspects, the techniques described herein relate to an apparatus, wherein: the tunable laser and tone generator module is configured to tone modulate the wavelength with a tone pattern indicative of the wavelength identifier.

In some aspects, the techniques described herein relate to an apparatus, further including multiple optical transponders coupled to the apparatus through multiple output ports of the output ports of the optical demultiplexer, and the controller is further configured to: repeat auto-tuning for each of the multiple optical transponders.

In some aspects, the techniques described herein relate to an apparatus, wherein the controller is further configured to perform: when the wavelength is detected, which indicates that the optical transponder is tuned, performing an end-to-end circuit check for the optical transponder, the end-to-end circuit check including exchanging optical frames using the wavelength with a far-end optical transponder through the apparatus.

In some aspects, the techniques described herein relate to a system including: an optical transponder; and an optical terminal configured to auto-tune the optical transponder by: cycling through wavelengths in sequence, and for each wavelength: modulating the wavelength to convey a wavelength identifier of the wavelength, to produce a modulated wavelength; transmitting the modulated wavelength through an optical demultiplexer that is configured to pass wavelengths to output ports of the optical demultiplexer, one of the output ports being coupled to the optical transponder; waiting to detect a response wavelength, transmitted by the optical transponder, which matches the wavelength; and determining, based on whether the response wavelength is detected, whether to repeat cycling using a next wavelength because the optical transponder is not tuned or to stop cycling because the optical transponder is tuned.

In some aspects, the techniques described herein relate to a system, wherein the optical terminal is configured to perform determining whether to repeat cycling with the next wavelength or to stop cycling by: when the response wavelength is not detected, which indicates the optical transponder is not tuned, repeating cycling using the next wavelength; and when the response wavelength is detected, which indicates the optical transponder is tuned, stopping cycling.

In some aspects, the techniques described herein relate to a system, wherein the optical transponder is configured to perform: upon receiving the modulated wavelength, recovering the wavelength identifier; tuning an optical transmitter and an optical receiver of the optical transponder to operate at the wavelength based on the wavelength identifier; and transmitting the wavelength as the response wavelength.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of auto-tuning an optical transponder coupled to an optical terminal, comprising:
cycling through wavelengths in sequence by, for each wavelength:
modulating the wavelength to convey a wavelength identifier of the wavelength, to produce a modulated wavelength that conveys the wavelength identifier;
transmitting the modulated wavelength from the optical terminal through an optical demultiplexer that is configured to pass modulated wavelengths to output ports of the optical demultiplexer;
waiting to detect a response wavelength, transmitted by the optical transponder, which matches the wavelength;
determining, based on whether the response wavelength is detected, whether to repeat cycling using a next wavelength because the optical transponder is not tuned or to stop cycling because the optical transponder is tuned; and
by the optical transponder:
upon receiving the modulated wavelength, recovering the wavelength identifier; and
tuning the optical transponder to operate at the wavelength based on the wavelength identifier.

2. The method of claim 1, wherein determining whether to repeat cycling with the next wavelength or to stop cycling includes:
when the response wavelength is not detected, which indicates that the optical transponder is not tuned, repeating cycling using the next wavelength; and
when the response wavelength is detected, which indicates that the optical transponder is tuned, stopping cycling.

3. The method of claim 1, wherein:
waiting to detect the response wavelength includes waiting to detect the response wavelength only for a predetermined period of time; and
determining includes determining whether to repeat cycling using the next wavelength or to stop cycling based on whether the response wavelength is detected within the predetermined period of time.

4. The method of claim 1, wherein:
the optical demultiplexer is configured to pass the wavelengths selectively from an input port of the optical demultiplexer that is coupled to the optical terminal to corresponding ones of the output ports of the optical demultiplexer;
an optical multiplexer to pass the wavelengths selectively from corresponding ones of input ports of the optical multiplexer to an output port of the optical multiplexer that is coupled to the optical terminal;
transmitting includes transmitting the modulated wavelength through one of the output ports of the optical demultiplexer that corresponds to the wavelength; and
waiting to detect the response wavelength includes waiting to detect the response wavelength through one of the input ports of the optical multiplexer that corresponds to the wavelength.

5. The method of claim 1, wherein:
modulating includes tone modulating the wavelength with a tone pattern indicative of the wavelength identifier.

6. The method of claim 1, further comprising multiple optical transponders coupled to the optical terminal through multiple output ports of the output ports of the optical demultiplexer, and the method further comprises:
repeating auto-tuning for each of the multiple optical transponders.

7. The method of claim 1, wherein the optical transponder includes an optical receiver and a tone detector coupled to one of the output ports of the optical demultiplexer, and an optical transmitter coupled to an input port of input ports of a multiplexer having an output port coupled to the optical terminal, and wherein:
receiving the modulated wavelength includes receiving the modulated wavelength via the tone detector, recovering the wavelength identifier; and
tuning the optical transponder includes tuning the optical transmitter and the optical receiver to operate at the wavelength.

8. The method of claim 7, further comprising, at the optical transponder:
by the optical transmitter, after tuning, transmitting the wavelength.

9. The method of claim 1, further comprising:
when the wavelength is detected, which indicates that the optical transponder is tuned, performing an end-to-end circuit check for the optical transponder, the end-to-end circuit check including exchanging optical frames using the wavelength with a far-end optical transponder through the optical terminal.

10. The method of claim 1, wherein the optical transponder includes an optical receiver and an optical transmitter that are each configured to process optical signals having a dense wavelength-division multiplexing (DWDM) spectrum.

11. An apparatus comprising:
a tunable laser and tone generator module;
an optical channel monitor; and
a controller configured to control the tunable laser and tone generator module and the optical channel monitor to auto-tune an optical transponder that is coupled to the apparatus by:
cycling through wavelengths in sequence by, for each wavelength:
causing the tunable laser and tone generator module to modulate the wavelength to convey a wavelength identifier of the wavelength, to produce a modulated wavelength that conveys the wavelength identifier;
causing the tunable laser and tone generator module to transmit the modulated wavelength through an optical demultiplexer that is configured to pass modulated wavelengths to output ports of the optical demultiplexer;

waiting for the optical channel monitor to detect a response wavelength, transmitted by the optical transponder, which matches the wavelength;

determining, based on whether the response wavelength is detected, whether to repeat cycling using a next wavelength because the optical transponder is not tuned or to stop cycling because the optical transponder is tuned; and upon detecting the response wavelength, which indicates that the optical transponder is tuned, performing an end-to-end circuit check for the optical transponder, the end-to-end circuit check including exchanging optical frames using the wavelength with a far-end optical transponder through the apparatus.

12. The apparatus of claim 11, wherein the controller is configured to perform determining whether to repeat cycling with the next wavelength or to stop cycling by:

when the response wavelength is not detected, which indicates that the optical transponder is not tuned, repeating cycling using the next wavelength; and when the response wavelength is detected, which indicates that the optical transponder is tuned, stopping cycling.

13. The apparatus of claim 11, wherein:

the controller is configured to perform waiting by waiting for the optical channel monitor to detect the response wavelength only for a predetermined period of time; and the controller is configured to perform determining by determining whether to repeat cycling using the next wavelength or to stop cycling based on whether the response wavelength is detected within the predetermined period of time.

14. The apparatus of claim 11, wherein:

the optical demultiplexer is configured to pass the wavelengths selectively from an input port of the optical demultiplexer that is coupled to the apparatus to corresponding ones of the output ports of the optical demultiplexer;

an optical multiplexer to pass the wavelengths selectively from corresponding ones of input ports of the optical multiplexer to an output port of the optical multiplexer that is coupled to the apparatus;

the tunable laser and tone generator module is configured to transmit the modulated wavelength through one of the output ports of the optical demultiplexer that corresponds to the wavelength; and the controller is configured to perform waiting by waiting to detect the response wavelength through one of the input ports of the optical multiplexer that corresponds to the wavelength.

15. The apparatus of claim 11, wherein:

the tunable laser and tone generator module is configured to tone modulate the wavelength with a tone pattern indicative of the wavelength identifier.

16. The apparatus of claim 11, further comprising multiple optical transponders coupled to the apparatus through multiple output ports of the output ports of the optical demultiplexer, and the controller is further configured to:

repeat auto-tuning for each of the multiple optical transponders.

17. The apparatus of claim 11, wherein:

the wavelength identifier includes a digital code.

18. A system comprising:

an optical transponder; and an optical terminal configured to auto-tune the optical transponder by:

cycling through wavelengths in sequence, and for each wavelength:

modulating the wavelength to convey a wavelength identifier of the wavelength, to produce a modulated wavelength;

transmitting the modulated wavelength through an optical demultiplexer that is configured to pass the modulated wavelengths to output ports of the optical demultiplexer, one of the output ports being coupled to the optical transponder;

waiting to detect a response wavelength, transmitted by the optical transponder, which matches the wavelength; and determining, based on whether the response wavelength is detected, whether to repeat cycling using a next wavelength because the optical transponder is not tuned or to stop cycling because the optical transponder is tuned, wherein the optical transponder is configured to perform:

upon receiving the modulated wavelength, recovering the wavelength identifier;

tuning the optical transponder to the wavelength based on the wavelength identifier; and transmitting the wavelength as the response wavelength.

19. The system of claim 18, wherein the optical terminal is configured to perform determining whether to repeat cycling with the next wavelength or to stop cycling by:

when the response wavelength is not detected, which indicates the optical transponder is not tuned, repeating cycling using the next wavelength; and when the response wavelength is detected, which indicates the optical transponder is tuned, stopping cycling.

20. The system of claim 18, wherein:

tuning the optical transponder includes tuning an optical receiver and an optical transmitter of the optical transponder.

* * * * *